United States Patent [19]

Mustonen

[11] Patent Number: 5,124,698
[45] Date of Patent: Jun. 23, 1992

[54] METHOD AND APPARATUS FOR SYNCHRONIZING RADIO TRANSMITTERS IN A PAGING NETWORK

[75] Inventor: Arvo Mustonen, Espoo, Finland

[73] Assignees: Tecnomen Oy, Espoo, Finland; FA Erika Kochler, Sanstagern, Switzerland

[21] Appl. No.: 850,216

[22] Filed: Apr. 10, 1986

[30] Foreign Application Priority Data

Apr. 10, 1985 [FI] Finland .................................. 851417

[51] Int. Cl.$^5$ ............................................ H04Q 7/00
[52] U.S. Cl. ........................ 340/825.440; 340/825.21; 455/51.1
[58] Field of Search ...................... 340/825.14, 825.21, 340/825.44, 825.47, 825.48, 311.1; 455/51, 50, 53, 57, 56, 31, 38, 9, 10, 18, 24, 63, 67, 73; 375/107, 109; 370/100, 103, 104, 100.1, 104.1; 379/57, 56; 324/57 DE

[56] References Cited

U.S. PATENT DOCUMENTS

| | | | |
|---|---|---|---|
| 3,766,478 | 10/1973 | Lowry | 455/63 |
| 3,836,726 | 9/1974 | Wells et al. | 340/825.44 |
| 3,927,373 | 12/1975 | Janssens | 455/51 |
| 4,142,069 | 2/1979 | Stover | 375/107 |
| 4,178,476 | 12/1979 | Frost | 340/825.44 |
| 4,255,814 | 3/1981 | Osborn | 455/51 |
| 4,301,539 | 11/1981 | Kage | 455/51 |
| 4,411,007 | 10/1983 | Rodman et al. | 375/107 |
| 4,696,051 | 9/1987 | Breeden | 455/51 |
| 4,696,052 | 9/1987 | Breeden | 455/51 |
| 4,709,401 | 11/1987 | Akerberg | 455/51 |
| 4,709,402 | 11/1987 | Akerberg | 340/825.44 |
| 4,718,109 | 1/1988 | Breeden et al. | 340/825.44 |

FOREIGN PATENT DOCUMENTS 0118710 9/1984 European Pat. Off. .............. 455/51

*Primary Examiner*—Donald J. Yusko
*Assistant Examiner*—Edwin C. Holloway, III
*Attorney, Agent, or Firm*—Robert P. Simpson; Michael L. Dunn

[57] ABSTRACT

Method and apparatus for synchronizing radio transmitters in a paging network. A synchronization order of base stations is determined based in part upon the relative geographic locations of the stations, and is communicated to the base stations via a command signal transmitted by the paging network unit. A predetermined first base station transmits a synchronization signal to base stations to be synchronized. Subsequent sequences of synchronization signals may be transmitted from synchronized base stations until all base stations have been synchronized. The synchronization signals may be transmitted via radio waves, and the synchronization order is determined so as to minimize the number of synchronization sequences and maximize the number of base stations synchronized simultaneously in parallel. Transmitted synchronization signals are corrected to compensate for propagation delays caused by the distance between base stations and for delays which occur within an individual transceiver. Paging message signals are transmitted from a paging network unit to remote base stations for later transmission to paging receivers. Base station transmitters transmit both synchronization signals to other base stations and paging message signals to paging receivers. Synchronization signals and paging message signals may be transmitted to the base stations over different conducting media. Paging message signals are transmitted simultaneously from all base stations and are phase coherent within a common reception area so as to avoid interference. Base station transmitters are capable of transmitting both synchronization signals and paging message signals at the same frequency.

44 Claims, 7 Drawing Sheets

PSTN = PUBLIC SWITCHED TELEPHONE NETWORK
PT = PAGING TERMINAL
PNU = PAGING NETWORK UNIT
M = MODEM
TGC = TRANSMITTER GROUP CONTROLLER
TSI = TRANSMITTER SITE INTERFACE
TX = TRANSMITTER
RX = SYNCHRONIZATION RECEIVER
PRX = PAGING RECEIVER

METHOD AND APPARATUS FOR SYNCHRONIZING RADIO TRANSMITTERS IN A PAGING NETWORK

The present invention relates to a method and apparatus for synchronizing radio transmitters in a paging network, said paging network being connected to a public switched telephone network and comprising in the transfer sequence of paging messages:
- a paging network unit, provided with means for receiving, processing and transmitting messages in digital form as well as means for manual feeding of network-related parameters,
- transmitter site interfaces which have a data communication connection to the paging network unit and have means for receiving, processing and transmitting messages in digital form,
- base station radio transceivers, whose transmitters under the control of the above controllers broadcast radio signals intended both for paging and for synchronizing the base stations covering a common overlap area.

First studied is the passage of paging information inside the system. Paging can be initiated by using any telephone set in the public switched telephone network to dial the paging network code number and the code number of a receiver to be paged. The call is directed on the basis of the paging network code number to a paging terminal which receives the number to be paged and forwards it to a paging network unit which is in immediate connection therewith and controls a network of base stations. The data transfer between a paging terminal and a paging network unit is digital information in serial form at the speed of 512 bauds. The transmission protocol in this transfer complies with POCSAG code structure (Post Office Code Standardization and Advisory Group).

The paging network unit, group controllers and transmitter site interfaces are connected to each other by bidirectional modem connections. The data transfer method is a synchronous message-oriented protocol at the speed of 2400 bauds, wherein the correctness of data transfer is checked. The frame of actual messages complies with the SDLC standard which is a structure according to the CCITT recommendation X.25. level 2.

The paging network unit transmits the paging numbers received from a paging terminal as a so-called paging message to group controllers which in turn forward them to transmitter site interfaces. On transmitter site interfaces the messages are decoded and paging numbers are worked into code words according to the POCSAG standard. The code words are worked to form a batch which is radio broadcasted to be interpreted by the receivers carried by persons being paged. Thus, the paging messages can be sent to individual paging receivers any time of the day from any telephone set connected to the public switched telephone network. A paging receiver is provided with both a display and tone signal output. An ordinary paging call may optionally include four different messages; in other words a paging receiver produces one of four different alarm tone signals, the purpose of each being agreed on beforehand. The system can also be used for sending numerical or alphanumerical information to the display of a paging receiver, (e.g., for caller's telephone number).

The transmitter site interface controls the radio transmitter in a manner that the information bits of POCSAG batches are transmitted in serial form at the speed of 512 bauds to receivers. The modulating method applied in radio transmission is direct FSK (Frequency Shift Keying), the deviation being $+/-4,5$ kHz. The carrier wave frequency is 146,325 MHz. The positive frequency deviation represents logic "0" and the negative frequency deviation represents logic "1".

In a relatively dense base station network, a problem with the above method of radio transmission is that a paging receiver may simultaneously receive a transmission from a plurality of base stations as sum information, whose correctness is the more endangered the more its partial components have phase difference with each other. The problem caused by these phase differences has been investigated in laboratory conditions. These investigations have revealed that the reception. of messages is disturbed by the operation of two transmitters in the worst case as follows:

a) the intensity of radio signals in the vicinity of the receiver is equal within the range of 3 dB, and b) the data signals have a minimum phase difference of at least $\frac{1}{4}$ of a bit.

The condition of item a) is fulfilled in practice when a receiver is located within an area overlapped by and common to two transmitter stations. With respect to synchronization, the situation is at its worst when attenuation of transmitter signals is mainly based on the attenuation caused by distance (free propagation attenuation). Taking into consideration the output power used, the wave length and the signal-to-noise ratio in practice, such a worst case overlap area can be estimated to be in the region of 3 km.

In order to provide data signals (512 bits/sec) with maximum phase difference $\frac{1}{4}$ of a bit, the transmitters should be synchronized with each other in a manner that the data signals leaving the antennae of stations close to each other do not have a phase error of more than $+/-239$ μs with respect to a nominal "correct" phase (propagation delay in the overlap area is in the range of approximately $+/-5$ μs). The synchronization of transmitters which are far away from each other is not significant with respect to reception disturbances.

Thus, the problem concerning distrubances in the overlap area can be eliminated by synchronizing the signals of paging transmitters so that there are no significant phase differences between stations located close to each other.

Several different solutions have been proposed earlier for synchronization of an entire network of base stations. Examples of these include time zoned transmission technique and so-called line synchronization, the most important advantage of these being easy theoretical feasibility.

In fact, the time zoned transmission technique does not relate to synchronization at all, as it merely circumvents the problem. The solution is based on transmitting the messages during four time zones, during each of which transmission is carried out with $\frac{1}{4}$ of the number of base stations at a time. If stations which are operating simultaneously in each transmission are correctly chosen, they shall not have overlapping areas and the problem is avoided. The division into four is based on the fact that the above can be made to work in its minimum with four time zones. The main drawback in this technique is that the total throughput capacity of an entire network of base stations will only be ¼ of what is obtained by using a truly synchronized technique.

What is meant by line synchronization is that propagation delays in data transfer connections between paging terminal and base stations are arranged at some fixed value. If a message to be sent is transmitted in this type of system synchronously from a paging terminal, it will leave the base stations synchronously as well. However, this system includes the following drawbacks:

- restricts the structure and extent of a data transmission network as it works in practice with direct connections only, where modems are not used
- is inconvenient with respect to maintenance and service.

The structure is restricted by the fact that nothing but a direct connection between base station and terminal is possible in practice; e.g., a multilevel extensive paging network is not possible. The use of modems is also out of the question since they operate on quite a low frequency range (1000 Hz–2000 Hz) and their operation both at the transmitting and receiving end is not synchronized (phase locked). The errors created therein are too rough for synchronization requirements. The reason for service and maintenance is that connections that are stable in terms of delays do not often exist in practice and a situation achieved by means of special equalizers changes as a function of time and environmental conditions, resulting in a continuous need of adjustment and maintenance. Thus, the connections must also be predetermined and, hence, arbitrary rerouting connections in case of malfunction are out of the question.

The radio path in communication between base stations is a most excellent media in view of synchronization since the time-based phenomena therein are sufficiently accurate, relatively stable and well-known. In principle, the radio synchronization between two base stations is known in the art but in practice it has not yet been possible to develop a radio synchronization method capable of controlling the synchronization of even an extensive radio network and executing the synchronization with such a high accuracy that the time between two successive rounds of synchronization will be sufficiently long for synchronization not to substantially reduce the transmission capacity of paging messages.

The radio synchronization is executed using the same frequency as the actual transmission of paging messages. In reserving the radio path for its own disposal, the synchronization reduces the transmission capacity of paging messages. This drawback can be minimized in two different ways: a) by attempting to minimize the need for synchronization, i.e., to keep the period between successive rounds of synchronization as long as possible and, b) by executing the synchronization as quickly as possible. In addition, the synchronization must be performed in a manner such that the paging receivers do not incorrectly interpret the synchronization as a page.

An object of the invention is to provide a radio synchronization method and apparatus for a paging network of the above type which method and apparatus - with no special requirements for the equipment and structure of a paging network—facilitates the control over synchronization of even an extensive network and provides for synchronization with such a high accuracy that the effect of synchronization on the paging message transmission capacity will be minimized.

In order to achieve this object, the synchronization method and apparatus of this invention comprises the following actions:

a) a paging network unit (PNU), which is common to base stations, is used to set up a synchronization plan, including

- determination of a synchronization route
- choice of a base station to start the synchronization
- determination of route-linked identifier for each base station
- determination of distances between base stations along the route b) a paging network unit (PNU), which is common to base stations, is used to send to transmitter site interfaces (TSI) via a data transmission network a synchronization command which according to said synchronization plan includes

- information about whether the command-receiving station is the starter of synchronization or not
- a route-related identifier, on the basis of which a station to be synchronized identifies and accepts only a synchronization signal received via the determined route
- information about the propagation delay of a synchronizing signal c) a synchronization signal is transmitted from the transmitter of a base station chosen as the starter of synchronization in accordance with the synchronization command d) the synchronization signal is received on the receivers of base stations within the reception range thereof and identification information in the received signal is compared with the information given in the synchronization command e) if the comparison of paragraph d) indicates that the received synchronization signal is intended for synchronization of the receiving base station, the clock/signal transmitter of a receiving base station is synchronized to the synchronization signal, f) the transmitter of a base station determined as the starter is switched off and the transmitters of just synchronized base stations are switched on for transmitting the synchronization signal of a second synchronization sequence, g) the synchronization of base stations to be synchronized during the second synchronization sequence is performed according to paragraphs d) and e) with such addition, however, that a synchronizing base station's own receiver receives a signal transmitted by the same station and prior to transmitting the actual synchronization message the phase of a signal to be transmitted is corrected, i.e., shifted forward in time to an extent that corresponds to the sum of delays created in transmitter and receiver and the propagation delay given in the synchronization command, h) a required number of synchronization sequences are executed until the last base stations have transmitted a synchronization signal that is no longer received on other base stations such that the only remaining task is to correct the phase of the clock/signal transmitter of that very station for compensating for the propagation delay and the delay developed in the transceiver.

In order to fulfill the object of the invention it is also important to use a paging network unit to make a synchronization plan, comprising the determination of synchronization sequences on the basis of the location of stations in a manner that the number of sequences required for synchronization will be as small as possible, i.e., the number of base stations to be synchronized in parallel simultaneously in each synchronization sequence will be as high as possible in average, and that the paging network unit is used to determine the instant of broadcasting the actual pages in a manner that the transmission synchronism will be independent of the structure and properties of a digital transmission network.

The accuracy of synchronization can be further improved by supplying the paging network unit with information about the distances between base stations and in a manner that a synchronization command to be sent from the paging network unit via a digital transmission network to transmitter site interfaces will include information about the distance of a synchronizing base station from a base station to be synchronized or about a signal propagation delay caused by this distance, whereby the phase correction of a signal to be sent in points g) and h) is supplemented with a propagation delay created in the preceding synchronization sequence over the distance between base stations.

According to a preferred embodiment of the invention a route-related identifier is the time to start synchronization performance which, in the case of a base station chosen as the starter, is the instant at which the starting station transmits a synchronization message and, in the cases of other base stations, the instant at which a synchronizing message is received by the base station. The advantage of this embodiment is that the time synchronization via a digital transmission network need not be very accurate.

One embodiment of the invention will now be described in more detail with reference made to the accompanying drawings, in which FIG. 1 is a block diagram of a paging network of the invention and connection of said paging network to a public telephone network.

Figure 1:
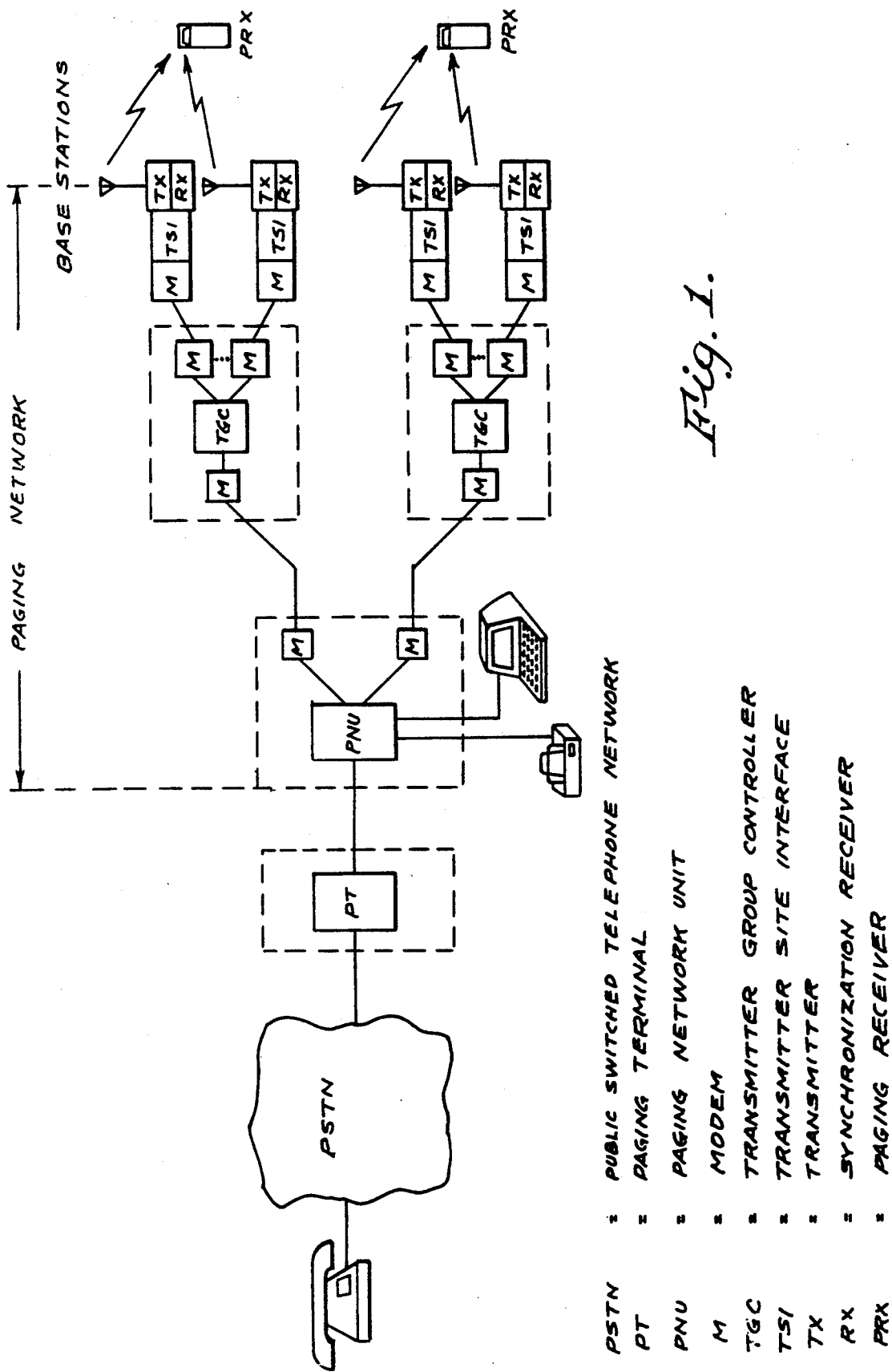

In reference to FIG. 1, first described is the general design of a paging network. Paging calls are fed via a public switched telephone network PSTN. The calls can be initiated from any telephone set in a public telephone network.

A paging terminal PT operates as an interface between public telephone network and paging network. All paging calls are validated and acknowledged by paging terminal PT. For this purpose, it keeps a record of all holders of paging receivers and their special service features.

A paging network unit PNU controls the entire paging network consisting of transmitter group controllers TGC and transmitter site interfaces TSI. Operation and maintenance functions of a paging network are controlled through I/O-devices attached to paging network unit PNU. Also, the synchronization of a network is initiated by paging network unit PNU.

Figure 2:
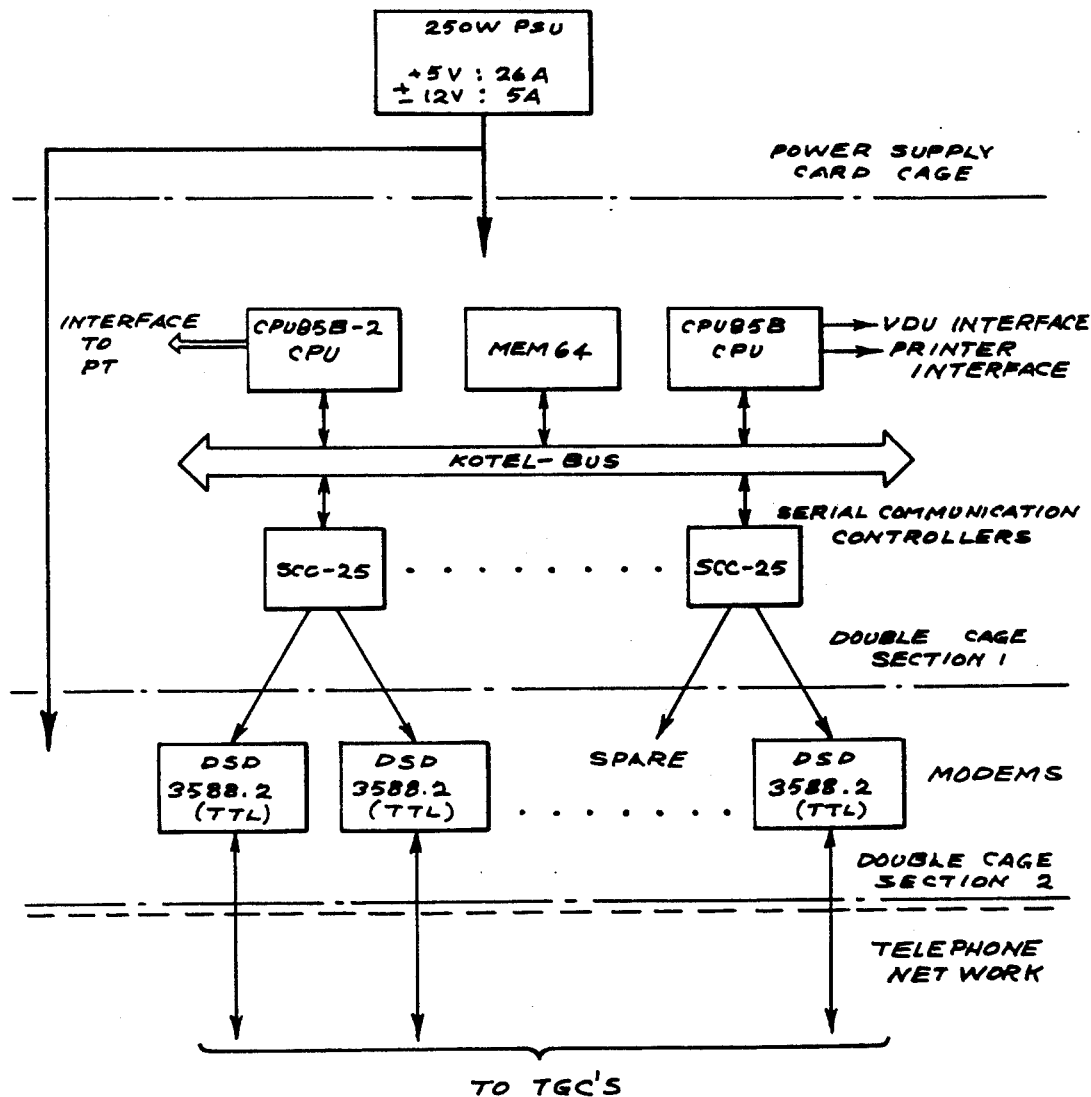
FIG. 2 is a block diagram of a paging network unit which is a part of the paging network of FIG. 1.

A master central processing unit (CPU85B) on the right-hand side in the block diagram of FIG. 2 controls the entire paging network unit and contains a memory, timers and serial interfaces for an alarm printer and video display terminal. A slave central processing unit (another CPU85B) receives the paging messages from paging terminal PT and queues them into buffers on a MEM4-memory. The paging messages towards transmitter group controllers TGC are controlled by a number of specialized I/O-controllers (SCC25), each containing a microprocessor and a buffer memory. The paging network unit regroups the paging messages and queues them for transmission to transmitter group controllers TGC. The paging network unit controls the operation and synchronization of a paging network. It decides about the initiation of the periodic radio synchronization process of transmitters.

Figure 3:
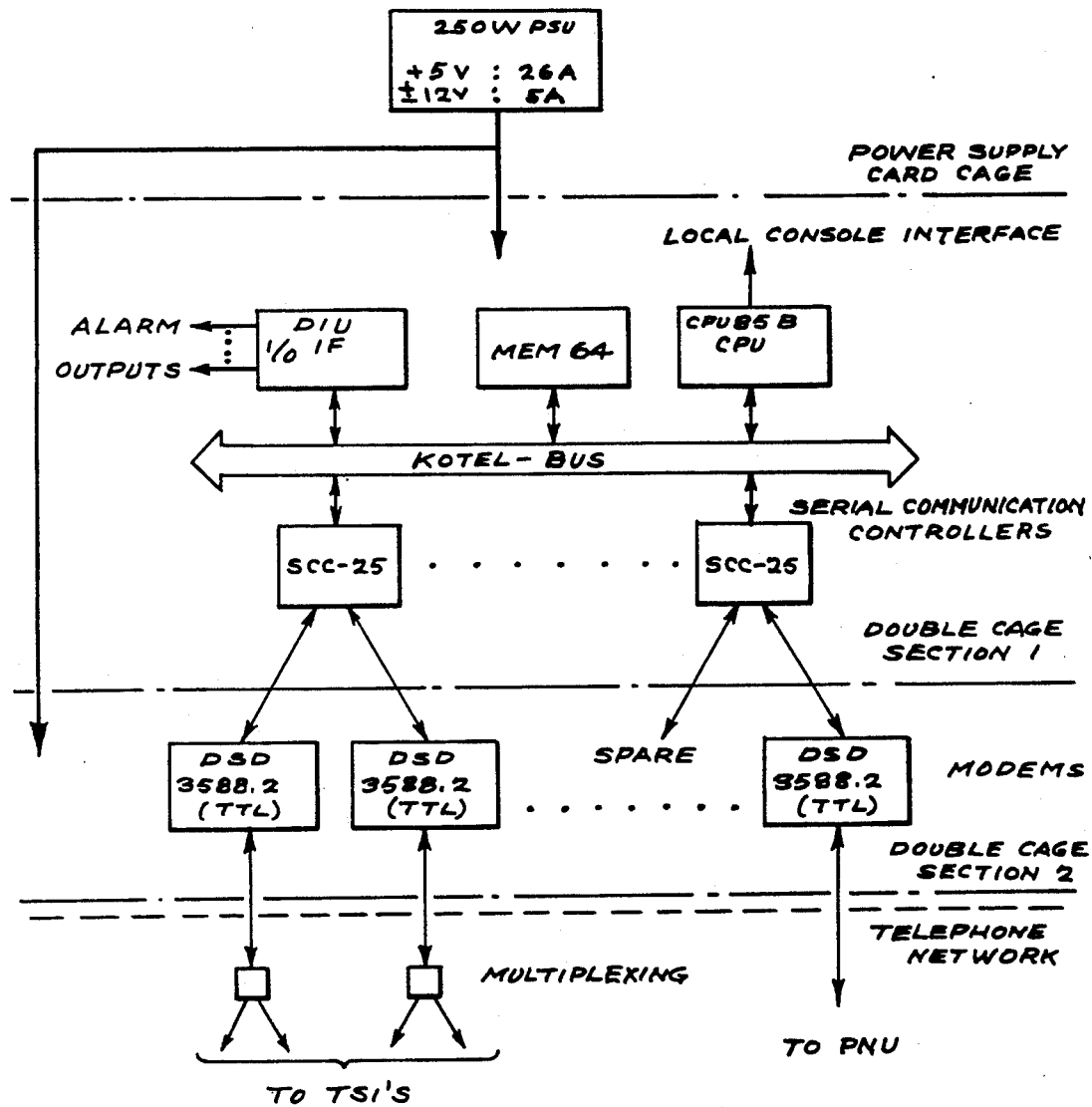
FIG. 3 is a block diagram of a transmitter group controller which is a part of the paging network of FIG. 1.

FIG. 3 shows a block diagram of transmitter group controllers indicating that a transmitter group controller is based on the same telecommunication modules which were used in the paging network unit.

A single SCC25 is used for connection with paging network unit PNU (both channels are employed if PNU is duplicated). By means of the remaining seven SCC25's it is possible to connect the TGC with up to 56 base stations (one serial channel can be connected with four base stations). The task of transmitter group controllers TGC is to control one node in the network; they check the correctness of data packets received from the paging network unit, pass them on toward base stations and assert the correct reception of data packets by the base stations. The transmitter group controllers TGC have another important function in the preparation stage of synchronization as a transmission means of command data to base stations. Minor paging networks can also be constructed without transmitter group controllers.

Figure 4:
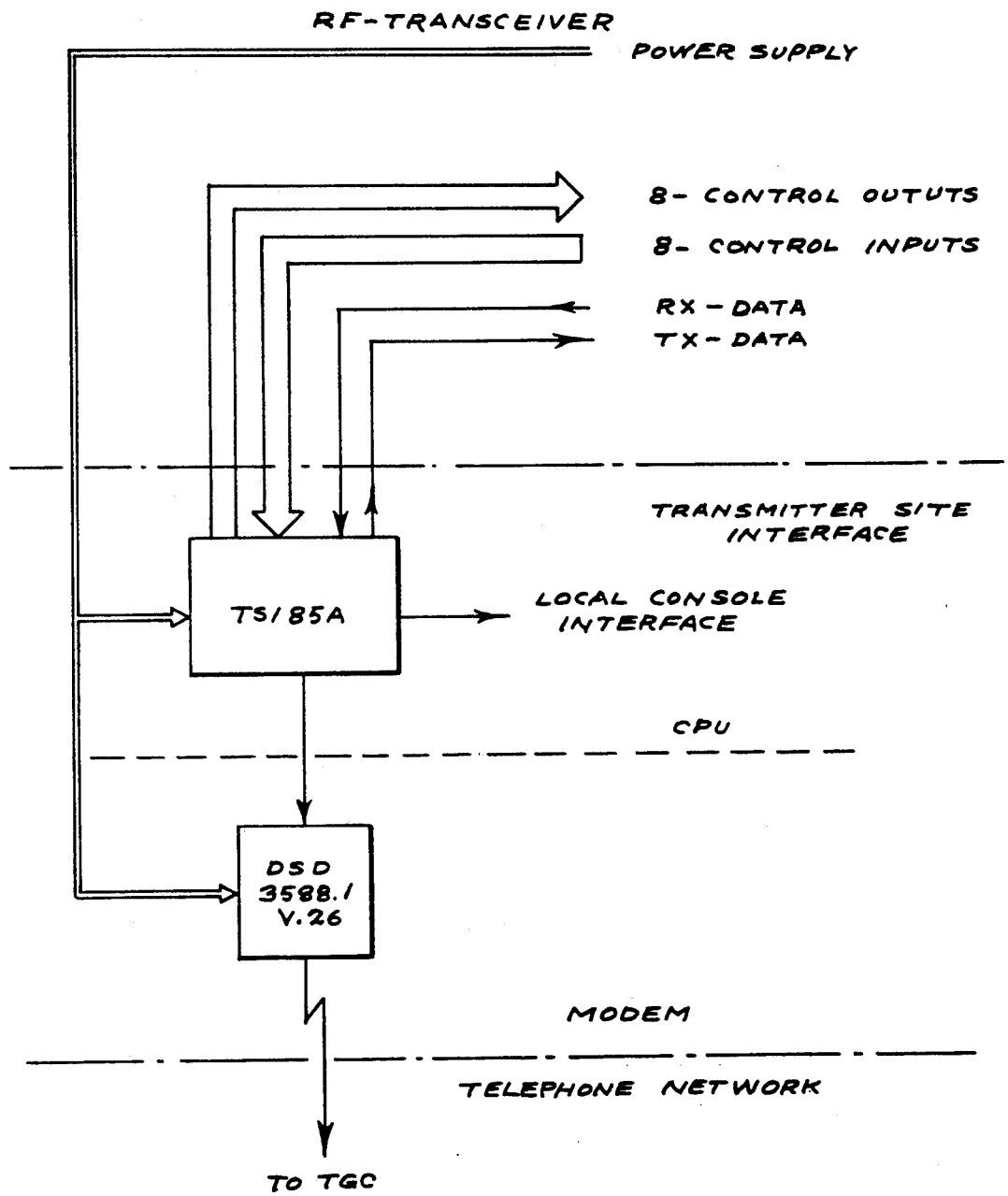
FIG. 4 is a block diagram of a transmitter site interface in the paging network of FIG. 1.

Shown in FIG. 4 is a block diagram for a base station. A base station is divided into two separate sections, namely a transmitter site interface TSI which is the remotest part of a paging network and a transceiver hardware which contains the actual radio-frequency equipment. The transmitter site interface TSI consists of two modules: a TS185A CPU board and a standard V.26 card modem. The TS185A is a modified version of a standard CPU85B processor card, adapted to control a radio transmitter and alarm lines (see FIG. 5). The TS185A contains all the circuitry needed to create an "intelligent" base station. One of its most important tasks is to perform all the functions needed for successful synchronization. The transmitter site interface recognizes and receives from a multipoint modem line those messages intended specifically for itself. The paging information contained in those messages is converted into POCSAG format according to which an RF-transmitter is then controlled. However, a message from the transmitter site interface can also be of non-paging-information nature, for example a command for the transmitter site interface to report its status to the transmitter group controller, activate or block the base station, participate in the periodic radio synchronization of the network, etc., Next described is how to perform the radio synchronization of a paging network by the application of a method of the invention.

The paging network unit PNU is responsible for initiating synchronization and related planning. For this reason, during configuration of the system, the paging network unit is provided with the following information on parameters:

desired interval for performing synchronization characteristics of other base stations within "coverage area" of each base station as well as distances to those with 1 km resolution.

The paging network unit PNU determines on the basis of "coverage" or reception information received thereby (distances between base stations) whether a system covering the whole country can be synchronized as one area by using the existing radio connections between base stations. If this is not the case, further defined are those independent, so-called isolated areas that can be synchronized internally but have no radio connection to other areas. How so-called isolated areas are defined will be described in more detail later. In this context it can be said that the smallest of such isolated areas is an individual base station which has no radio connection to other base stations. Taking into consideration the reception conditions between base stations (not only distances between stations but also sensitivity of a receiver, height of antennae, etc.), it can be found that, in view of a paging receiver, there is no problem in practice between such isolated areas caused by the fact that they are not synchronized to each other, so for synchronization, such areas can be designated to operate independently of each other. In practice, this means that the entire system can contain several so-called synchronization starters—one for each isolated area.

Thus, on the basis of what has been stated above, the synchronization planning operation also involves finding a starter for each isolated area. A criterion in this definition is to choose such a starter that the number of synchronization sequences (messages transmitted from one station to another) is minimized. This means that the number of base stations synchronized simultaneously in parallel in each synchronization sequence is maximized.

The actual synchronization is commenced by having the paging network unit PNU transmit via the transmission network a command to a transmitter site interface (interfaces) chosen thereby to initiate synchronization at a certain instant. On the other hand, the remaining transmitter site interfaces TSI of the paging network or an isolated area are supplied with a command to prepare for receiving the incoming synchronization information at a certain instant according to the plan prepared by the paging network unit. For base stations of the same synchronization sequence this instant is the same, with very rough resolution (1/16 sec.), however, compared to the accuracy a 512 baud signal must be synchronized with. A synchronization sequence takes 8/16 seconds so the instants stated in the commands given to the sucessively synchronized stations will be 8/16 seconds apart from each other. The instant serves in synchronization as the identifier of a synchronization message so as to make sure that a synchronization signal was received via the planned route.

In addition to the instant, the stations to be synchronized (receiving a synchronization message through radio path) are supplied with the information concerning the distance at which the synchronizing station lies, whereby the signal propagation delay can be mathematically compensated at the receiving end, as explained in more detail later. The identifier (time) in a synchronization message quarantees that the synchronization route and the corresponding distance correlate correctly to each other.

Prior to initiating the actual synchronization, but following the synchronization command messages transmitted in the transmission network, the paging network unit PNU informs the transmitter site interfaces TSI of its own time to a resolution of 1/16 of a second. The purpose of this clock time is to keep the clock time of a synchronized network and that of the paging network unit roughly the same (to an accuracy of a few seconds). However, the network is synchronized accurately particularly to the starter's time. Possible corrections in approximate time prior to the start of a synchronization cycle are made by transmitter site interfaces always to a resolution of 1/16 of a second whereby, with respect to resynchronization, information is obtained about the synchronization interval accumulated time shift (in the order of tens or hundreds of microseconds), said shift being noticed in practice as a phase difference between the received synchronization signal and the TSI's own internal clock.

Just prior to the moment of initiating synchronization, the receiving base stations switch off their transmitters and, accordingly, switch on their synchronization receivers. At the starting moment of synchronization, a chosen starter transmits a 32 bit synchronization radio message. The same message is repeated for better reliability. The receiving stations will synchronize themselves to this message as described later. All those receiving stations which can receive this message correctly as well as recognize the time information in said message to be the same as that received from the paging network unit together with the synchronization initiating command, will synchronize their internal clocks so as to be in phase with certain bit transitions in the received radio message.

Thereafter, the receiving stations switch their synchronization receivers off and transmitters back on. The time reserved for these actions in a synchronization sequence is exactly 5/16 of a second.

Thus these synchronized stations will then become synchronizing stations which, at the start of a following synchronization sequence, correspondingly send a 32 bit message twice. At this stage, the starter no longer participates in transmission.

The above described synchronization sequence is repeated according to a predetermined plan by the PNU so many times that synchronization propagates in successive waves throughout the entire isolated area. Thus, during the entire synchronization process, each station is synchronized once to a preinformed message and transmits once itself a synchronization message.

A synchronization message transmitted between two base stations will now be studied in more detail.

Thus, synchronization between two base stations proceeds in a manner that the synchronizing station transmits a specific 32 bit synchronization message. Contents of the radio message are as follows:

| !MF! | REV | !B! | CNTR | ! | CRC | !EP! |
|---|---|---|---|---|---|---|

MF: Length 1 bit (D0). Always one, so that subscriber receivers would not erroneously interpret this message as a page.

REV: Length 10 bits (D1–D10). Zeros and ones alternatively (reversal) for bit synchronization of a receiving station. Begins with zero and ends with one.

B: Length 1 bit (D11). Separator, which is always one and thus provides two successive ones with D10.

CNTR: Length 9 bits (D12-D20). Synchronizing time information to a resolution of 1/16 of a second. Indicates time that has elapsed from the start of synchronization and at the same time to the receiver, does this message belong to it. As mentioned, the receiver obtained this time information from paging network unit in connection with synchronization command. Transmission of 32 bits at the speed of 512 bauds takes 1/16 of a second.

CRC: Length 10 bits (D21-D30). Check sum in accordance with POCSAG code standard.

EP: Length 1 bit (D31). Even parity of D0-D31.

Figure 7:
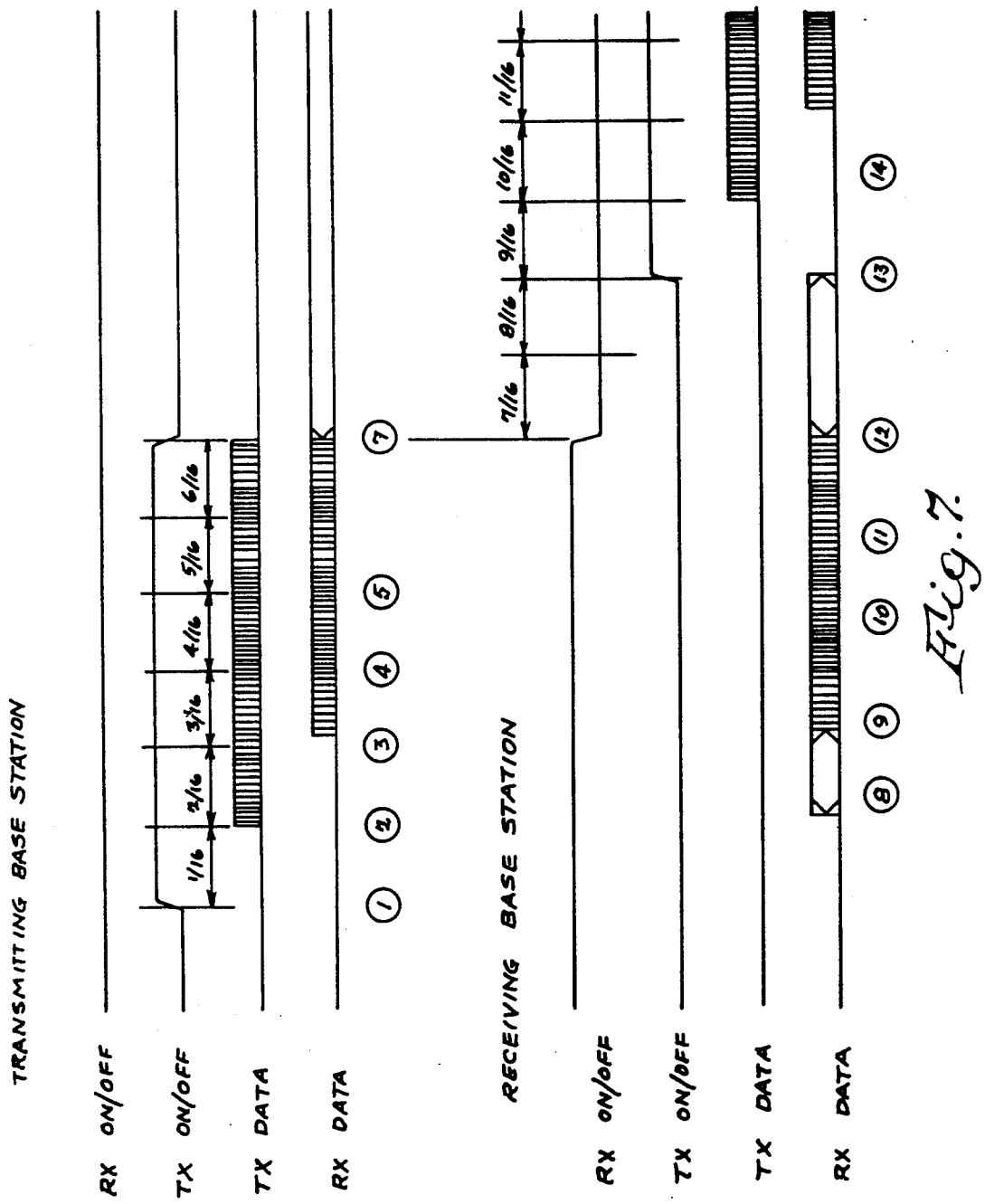
FIG. 7 shows a temporal distribution of a synchronization signal transmitted and received by base stations.

The numbers in the following description refer to the accompanying FIG. 7.

1: A synchronizing base station switches its own transmitter on well before (3/16 of a second) the start of the actual synchronization message transmission.

2: Before the transmitter output power has necessarily stabilized, the data line is controlled with half frequency preamble. The subscriber receivers cannot interpret this incorrectly for two reasons:
   a) the so-called message flag is "one"
   b) the check sum is wrong
      Neither can a station to be synchronized interpret this incorrectly since, at this stage, it is looking for a preamble of correct frequency. The purpose of this "transmission" is to secure the operation of both the synchronizing base station and the receiving synchronization receivers, Rx, in a manner such that the actual synchronization message will be received as correctly as possible.

3: In this stage, at the latest, the synchronizing receiver works properly, so the necessary transmitter-receiver pair delay measurement is then possible.

4: Transmission of the actual synchronization message begins. A normal preamble is transmitted for 1/16 of a second. At this point, also, a measurement is executed to determine the total signal propagation delay in the transmitter and receiver. In a calculation example presented later, this delay is represented with a term: ts+tap+tr+tag (see FIG. 5). The delay is compensated for together with a possible propagation delay caused by the distance (e.g., tn+tbd) by correcting the phase of the transmitted data with a corresponding amount. An exception to the above is the synchronization starter on which no delay measurement and compensation is definitely done, as indicated in the calculation example. The reason for this is that the time shift accumulated during the synchronization interval can be thus found out by a measurement (phase 10).

5 and 6: Synchronization messages (two of them) are transmitted.

7: When even the last bit (parity) has been transmitted, one waits for another 2/512 of a second whereafter the transmitter is switched off. As for the synchronizing station, the action is over for the moment.

8: A station to be synchronized is constantly "on guard". There is no absolute certainty about a coming signal at this time.

9: A synchronization receiver receives the coming transmission, which at this point is still the half frequency preamble.

10: The receiver uses the actual preamble to execute a phase comparison measurement by measuring the phase difference between its own "transmitter clock" and the incoming data. The result of this measurement is corrected mathematically for obtaining the final result (# equal to the time shift between the clocks during the synchronization interval) and for reporting the accumulated time shift to the paging network unit. The first part of the preamble is rejected because of the phase correction made by the transmitting base station (item 4:). The preamble is still present in the actual synchronization message, as pointed out above, and the actual bit synchronization (precise synchronization) is executed to a transition of an edge of the received data during the preamble is received. The correctness of the performed synchronization is further checked during the preamble and, if its accuracy is found to be too poor, bit synchronization will be repeated. After the synchronization, the incoming data is sampled in the middle of a bit. This is the 1st stage of synchronization.

11. Synchronization messages are received. Synchronization to the message level is performed by means of the separator (B). This is the 2nd stage of synchronization. As information is received from the paging network unit in connection with the synchronization command, the receiver is informed of the distance and time (D12-D20) (in the first message of the sequence) when a synchronization message addressed to it will be received. If the time in the received message matches with the one given in the command and the message is, by means of other checking, found as properly received, a final decision is made to get synchronized thereto. This is the last or 3rd stage of synchronization. If the time information in the received message does not match, the situation is checked during the other radio message but the synchronization is not kept valid as it was not intended for this station and, thus, the distance correction given would not be correct. If synchronization for one of the above reasons is decided not to take place, the action is reestablished from the beginning according to item 8:.

12: After reading the parity bit, the last bit in the message, the waiting time will be 2/512 of a second after which the receiver is switched off.

13: When the receiver has been switched off for 2/16 of a second, the transmitter is switched on.

14: Thus, the synchronized station has itself become a transmitting station and the procedure will be repeated thereon according to items 2:-7:. After performing this transmission, the transmitter site interface switches off its transmitter and remains waiting for a synchronization termination command from the paging network unit and for possible pages to be transmitted further.

Definition of the isolated areas is performed as follows:

In symbolic sense, the memory of a paging network unit contains a sort of matrix provided by the given source data. In the matrix, all those active stations that have a radio connection between each other are marked with 1 while in the opposite case the marking is 0. In practice, what has been described above is a source data table in the memory of a paging network unit, but in this case it is presented as a matrix to make it more understandable.

For example

|   | ! | 1 | 2 | 3 | 4 | 5 | 6 |
|---|---|---|---|---|---|---|---|
| 1 | ! | — | 0 | 1 | 0 | 0 | 0 |
| 2 | ! | 0 | — | 0 | 1 | 0 | 1 |
| 3 | ! | 1 | 0 | — | 0 | 1 | 0 |
| 4 | ! | 0 | 1 | 0 | — | 0 | 1 |
| 5 | ! | 0 | 0 | 1 | 0 | — | 0 |
| 6 | ! | 0 | 1 | 0 | 1 | 0 | — |

The corresponding geographical location of the base stations could be:

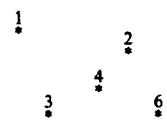

A paging network unit composes a vector (also in symbolic sense) for searching the areas, the number of elements in said vector being equal to that of base stations in the system. At this point, the value of each element is 0.

For example

```
  1   2   3   4   5   6
!0! 0! 0! 0! 0! 0!
```

The isolated areas are defined by going through the above matrix and marking in the vector the existence of connections presented in the matrix.

The search is started from the first base station by marking in the vector whose base stations for which there is a connection. In our example, the marking would thus be at elements 1 and 3 in the vector.

Thereafter, the purpose is to define "further connections" that the already-marked connecting stations have. For this reason, the following station on which the marking will be made is determined on the basis of the contents of the vector while the matrix serves as a reference data table. In our example, further connections are thus sought for station 3. As indicated in the matrix, 3 has connections to 1 and 5, so element 5 is marked in the vector as a "new" connection data.

Marking of the following further connections is continued as described above. Thus, in our example, base station number 5 as indicated in the matrix, has a connection to station 3 and, thus, new connection data is not coming to the vector.

At this point, it can be concluded from the vector contents that there are no more "unprocessed" further connection stations. This means that the isolated area has been defined. In our example, the area is formed according to the vector element markings by stations 1, 3 and 5.

On the other hand, it can also be seen from the vector that all base stations have not been processed yet (elements 2, 4 and 6 have not been marked), so the search must be continued. Search of the next isolated area can in principle be started from any unmarked base station. In our example, the first unmarked station is number 2.

The same way as in the search of the first area, the matrix indicates 4 and 6 as connecting stations, so those are marked in the vector.

On the other hand, the situation is now such that there are no more unprocessed stations in the example vector, so no more further connections need to be found out. It can be noted that the second isolated area is formed by stations 2, 4 and 6.

As an example, the definition of isolated areas as described above is performed for an integral area.

The geographic location of the stations could be as follows:

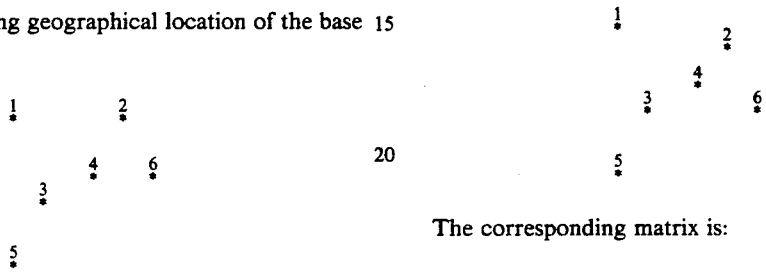

The corresponding matrix is:

|   | ! | 1 | 2 | 3 | 4 | 5 | 6 |
|---|---|---|---|---|---|---|---|
| 1 | ! | — | 0 | 1 | 0 | 0 | 0 |
| 2 | ! | 0 | — | 0 | 1 | 0 | 1 |
| 3 | ! | 1 | 0 | — | 1 | 1 | 0 |
| 4 | ! | 0 | 1 | 1 | — | 0 | 1 |
| 5 | ! | 0 | 0 | 1 | 0 | — | 0 |
| 6 | ! | 0 | 1 | 0 | 1 | 0 | — |

The search is again started from station 1, whose connecting station is 3 according to the matrix. Now, the only possibility of finding out further connections is station 3, whose connecting stations are 1, 4 and 5 according to the matrix. According to the vector markings, station number 1 has already been processed, so further connections are searched for stations 4 and 5. First processed is number 4, whose connecting stations are stations 2, 3 and 6 according to the matrix. It is noted now that the vector has no more "free" elements so the search can be terminated.

The final result is that all stations 1-6 form one isolated area that can be entirely synchronized.

The above examples also illustrate clearly enough why the definition of isolated areas is indeed necessary and why they must be synchronized separately.

Determination of isolated areas is performed by the paging network unit whenever the network status has changed during the period between synchronizations (change in configuration, some station being blocked, etc.). This need is quite obvious if we imagine that the base station 4 in our latter example is blocked or removed from the system completely. In this case, after all, the system will comprise two isolated areas instead of one entity. It can be further noted that, although the search of such areas is based on finding out the further connections, it does not as such define the most optimum route of carrying out synchronization.

Determination of the starter is performed as follows.

When all isolated areas in a network have been defined, it is necessary to appoint a starter for each area for starting the synchronization performance. A criterion for choosing a starter by the paging network unit is to do it so that the synchronization of an isolated area requires as few synchronization sequences as possible.

It can be readily seen from the first example above that, for an isolated area provided by stations 1, 3 and 5, a preferable starter is not 1 or 5 since synchronization would only advance one station at a time like in a queue. After all, the entire area can be synchronized with a single synchronization sequence if the starter is number 3 which has a connection both to 1 and 5.

A matrix shown in the example can be worked into a treelike figure with branches representing synchronization messages.

For example

|   ! | 1 | 2 | 3 | 4 | 5 | 6 |
|-----|---|---|---|---|---|---|
| 1 ! | — | 0 | 1 | 0 | 0 | 0 |
| 2 ! | 0 | — | 0 | 1 | 0 | 1 |
| 3 ! | 1 | 0 | — | 1 | 1 | 0 |
| 4 ! | 0 | 1 | 1 | — | 0 | 1 |
| 5 ! | 0 | 0 | 1 | 0 | — | 0 |
| 6 ! | 0 | 1 | 0 | 1 | 0 | — |

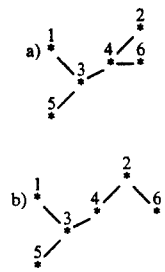

The exemplifed configuration can be given various branch systems depending on desired synchronization routes. The task of the paging network unit is simply to define a branch system that is branched as much as possible and the number of successive branches is minimized. As indicated in our example, the configuration of FIG. a) is preferable to that of FIG. b) since synchronization can be performed with only 2 sequences: 1.: 3-4, 3-1, 3-5, 2.: 4-2, 4-6.

The optimum synchronization route is found as follows:

Station 1 is marked with the stations it has a connection to. This is the first sequence of synchronization. Thereafter, these already-synchronized stations (level 2) are in turn marked with connecting stations in a similar manner. This is the second sequence of synchronization. Marking is continued in the above manner from level to level until the entire isolated area has been processed. This is followed by memorizing the number of sequences required for the synchronization of a network if the starter is station No. 1. The entire marking process described above is repeated for each station in an area. The chosen starter is naturally the station whose number of synchronization sequences is least.

A synchronization route is already determined in selecting the starter, as described above. In the first sequence, the starter alone serves as a transmitter. In the next sequence, all those having a connection to the starter. In general, the number of transmitting stations increases as synchronization proceeds. Thus, situations are also possible where one station receives from two stations transmitting simultaneously. However, the information sent thereby will be exactly the same since the contents of a message is linked to the moment of transmission.

For example

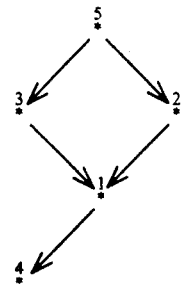

It is necessary to presume in our example that the rest of the network configuration is such that the route of synchronization proceeds just via station No. 5.

Now that stations 2 and 3, having been synchronized, transmit simultaneously a message, number 1 will receive them both. In order to create an actual disturbance to number 1, the phase difference of messages should be at least 488 μs and the intensities should be the same within the range of 3 dB. In practice, this situation is impossible in terms of distance (3 dB=1,4 km=4,7 μs; 488 μs=146 km=43 dB). In a situation like this, in the internal synchronization plan by the paging network unit, the actual synchronizer is chosen to be the one whose geographical distance to the one being synchronized is smaller as that corresponds with highest probability to a practical situation. For a station being synchronized this is revealed as distance information provided through the network.

As the plan has thus been prepared, each station is supplied with the time (1/16 of a second resolution) for receiving a radio synchronization message intended for it. The time is determined on the basis of the ordinal number of synchronization sequence level (8/16 of a second per sequence). In addition, the above-mentioned distance information is provided for delay compensation.

The following description relates to the procedure in a synchronized network for secure synchronous transmission of paging information regardless of the configuration of the transmission network in practice.

When the network of the isolated areas have been synchronized, this means in practice that the network runs exactly in the starter's time. On the other hand, the starter's time only matches the time of the paging network unit to an accuracy of a few seconds on the basis of a transmitted time message, as pointed out above. This aspect must be observed when transmitting the actual paging messages in order to make sure that all stations are transmitting the same page simultaneously.

The paging network unit tends to some degree to buffer the pages received thereby from the terminal in order to provide the base stations with longer simultaneous radio transmission periods. However, the buffering is such that, in a possible full-load situation, it does not slow down the transmission of pages. As it sends to the base stations a message containing pages, the paging network unit draws simultaneously a plan to determine at what precise time the pages will be transferred onto a radio path. First observed with a certain security margin is that the message has certainly reached all base stations. To this time is further added a certain security margin to compensate for possible difference in the clock times between the paging network unit and base stations. The final moment of radio transmission is then obtained by adding this calculated time to the real time of the paging network unit's own clock. This moment of transmission is indicated in a paging message to a resolution of 1/16 of a second. Thereafter, the paging network unit calculates the time or moment these pages have been sent when the starting moment is exactly that indicated in the paging message.

In planning the transmission moment of the following pages the above calculations are made accordingly and the result is compared to the termination moment of the presently going transmission. If these new pages are found ready to be transmitted prior to the end of transmission of the preceding pages (transmission network is faster in its communication capacity), the end of the preceding pages will be indicated as the moment of transmission which thus continues uninterrupted. A new ending moment is also calculated according to this. If it is found, however, that the new pages have not for sure reached all base stations prior to ending the radio transmission of the preceding ones—thus there may be a break in the radio transmission—the initiation of a new radio transmission cycle is prepared by issuing in the network message a command to send a 576-bit preamble prior to sending the pages, said preamble being dictated by POCSAG standard. The starting moment of radio transmission is then explicitly determined the calculated one. The time taken by the preamble (18/16 seconds) is also observed when calculating the new finishing time of transmission.

The above method facilitates the paging network unit PNU to provide synchronization-related information while a radio transmission of pages performed by a base station is still going on, since the PNU knows exactly the status prevailing at the base station. This offers the advantage that the time spent for transmitting synchronization commands in the data transmission network does not reduce the paging information transmission capacity of the system.

Next studied are problems relating to synchronization and its maintenance.

The basic problems of synchronization are sufficiently accurate realization thereof and maintaining the synchronous operation. In view of what has been explained above, the basis for studying these problems is that the data transmission network itself does not affect synchronization and in this study attention is paid to what happens to the synchronization information leaving a transmitter site interface TSI and also studied is the status or situation prevailing in a network thus synchronized.

A practical radio transmitter and synchronizing receiver are given the following specifications:

for maintenance of the synchronization the radio equipment is capable of supplying a transmitter site interface with a clock signal with a frequency of 6,4 MHz whose total accuracy is +/−0,3 ppm. The clock signal is divided by four inside the transmitter site interface, the basic clock frequency obtained being then 1,6 MHz. This, in turn, means that the basic synchronization resolution on a transmitter site interface is 625 nanoseconds. The transmitter clock frequency for 512 baud transmission is provided by means of a programmable divider from the 1,6 MHz clock. The basic division constant is then 3125.

a data signal leaving the transmitter site interface TSI is delayed inside a radio transmitter equipment as measured from the antenna for a certain constant time with an inaccuracy of +/−40 $\mu$s.

an input data signal at a transmitter site interface is delayed inside a synchronization receiver as measured from a signal received in the antenna for a certain constant time with an inaccuracy of +/−40 $\mu$s.

Figure 5:
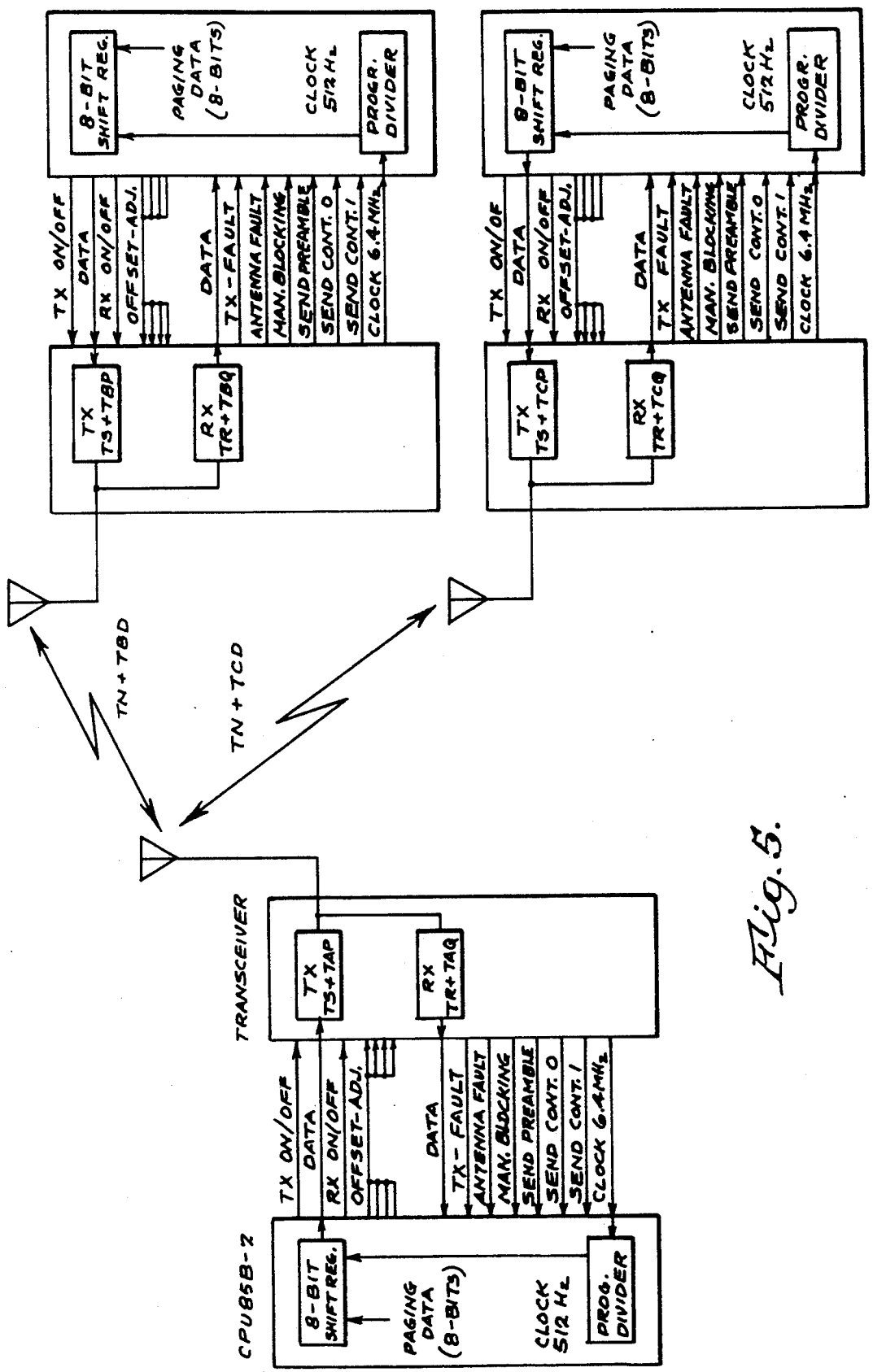
FIG. 5 shows the transceivers of base stations in the paging network of FIG. 1 as well as their data transfer connections and delays occurring therein.

The problem is clarified next in the light of a practical calculation example, with reference made to FIG. 5.

Designations:
synchronizing transmitter: TCa
transmitter to be synchronized: TCb
transmitter to be synchronized: TCc
nominal delay of transmitter (radio equipment): ts
nominal delay of synchronization receiver: tr Respective designations:

TCa transmitter delay deviation: tap (+/− 40 $\mu$s max)
TCb transmitter delay deviation: tbp (+/− 40 $\mu$s max)
TCc transmitter delay deviation: tcp (+/− 40 $\mu$s max)
TCa transmitter delay deviation: taq (+/− 40 $\mu$s max)
TCb transmitter delay deviation: tbq (+/− 40 $\mu$s max)
TCc transmitter delay deviation: tcq (+/− 40 $\mu$s max)

The nominal distance between stations is tn=100 $\mu$s=30 km. Since distances in practice vary between 20–40 km, the propagation delay variation caused by the ambiguity of a synchronization distance will be tbd/tcd=±33 $\mu$s. max provided that the propagation compensation is made on the basis of this nominal distance instead of the real distance, as described above.

The delays created in synchronization (TCa synchronizes TCb and TCc):
data received in TCb: (ts+tap)+(tn+tbd)+(tr+tbq)
data received in TCc: (ts+tap)+(tn+tcd)+(tr+tcq)

If synchronization only involves the corrections according to nominal times, the synchronization errors would be:
TCb: tap+tbd+tbq
TCc: tap+tcd+tcq The delays created in a transmission performed immediately after synchronization:
TCa: (ts+tap)
TCb: (tap+tbd+tbq)+(ts+tbp)
TCc: (tap+tcd+tcq)+(ts+tcp)

If the subscriber receiver were located in the overlap reception area common to TCa and TCb, the phase difference would be:
ts+tap−−
tap−tbd−tbq−ts−tbp=−(tbp+tbq)−tbd=113 $\mu$s max.

On the other hand, if the receiver were located in the overlap area common to TCb and TCc, the phase difference would be:
tap+tbd+tbq+ts+tbp-
−tap−tcd−tcq−ts−tcp=(tbp+tbq)−(tcp+tcq)-
+tbd−tcd=226 $\mu$s max.

The above calculation examples indicate that the error immediately after the synchronization is relatively substantial whereby, due to the time shift accumulation of the clocks, the need for synchronization is correspondingly more immediate. This in turn reduces the page transmission capacity of a network.

The above synchronization problems are well distinguished and can be resolved as follows:

a) A radio transmitter/receiver station must have such properties that the receiver is capable of receiving the station's own radio transmission. This way the transmitter site interface unit is able to measure the total delay deviation of transmitter and receiver in connection with synchronization. During normal operation this measuring result is used to pre-correct the phase of data passing to the radio transmitter to be "wrong" in a manner that in view of a paging receiver the signal is received in correct phase. It should be noted that the equipment costs of this solution are insignificant.

In connection with the system configuration, the previously disclosed connection and distance informations are provided as each TSI is presented. With this procedure, the tbd and tcd error factors can be substantially reduced from those set out in the calculation example.

As a result of the combined effect of the above-stated corrections, the phase error immediately after the synchronization drops even in practice down to circa $+/-20$ μs at the worst, the remaining time for time shift accumulation being $+/-219$ μs. Expressed as synchronization interval this means circa 12 minutes with above stated clock stability specification.

The case can be further illustrated by a practical calculation example:

The chosen synchronization route is e.g.: TCa synchronizes TCb and TCb in turn TCc, the situation being even a bit more difficult than the previous example.

TCa synchronizing TCb results in delays:
(ts+tap)+(tn+tbd)+(tr+tbg)

As explained above in connection with synchronization procedure, TCb performs (stage 4 in transmission) a correction:
−(tn+tbd)−(tr+tbg)−(ts+tbp)

Thus, in a data line from transmitter site interface to radio equipment there is a total phase error:
(ts+tap)−(ts+tbp)

The same way, as TCb synchronizes TCc there are delays:
(ts+tap)−(ts+tbp)+(ts+tbp)+(tn+tdd)+(tr+tcq)
=(ts+tap)+(tn+tdd)+(tr+tcq)

A correction to this results in:
(ts+tap)−(ts+tcp)

Thus, immediately after synchronization on leaving the antennae the delays would be:
TCa: (ts+tap)
TCb: (ts+tap)−(ts+tbp)+(ts+tbp)=(ts+tap)
TCc: (ts+tap)−(ts+tcp)+(ts+tcp)=(ts+tap)

Thus, the delay in the transmitter of the starter remains in the system as though "a basis" but that is insignificant in terms of a subscriber receiver since it is the equal at all stations. On the other hand, it can be noted that the delays of the transmitters and receivers of base stations need not be measurable separately.

Figure 6:
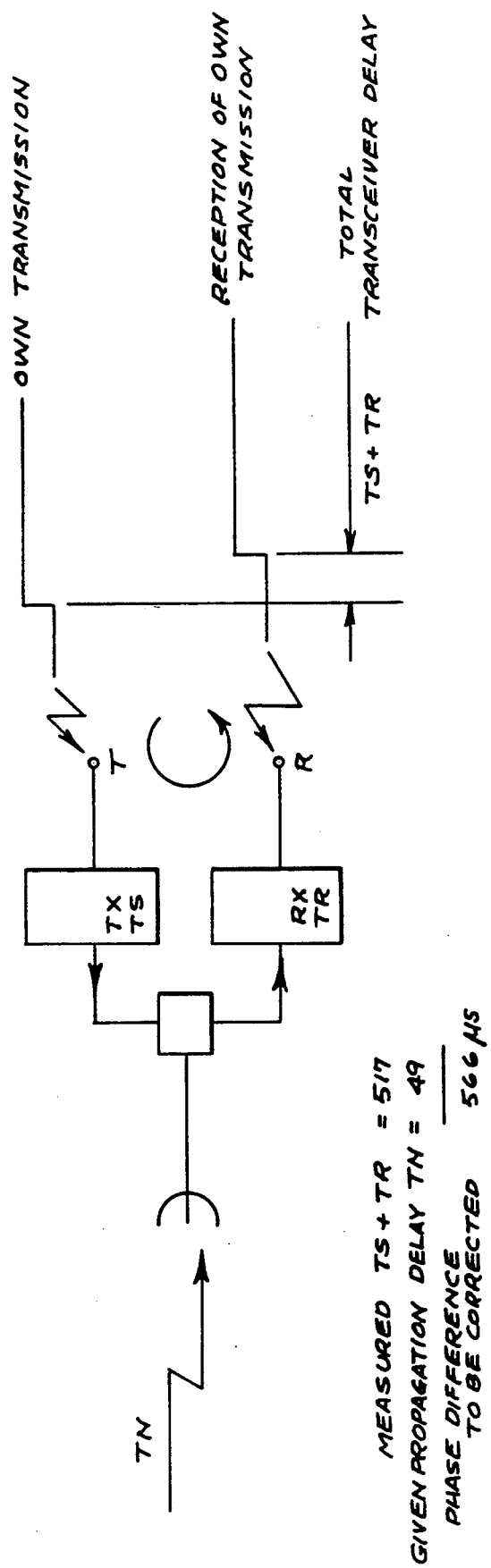
FIG. 6 shows schematically the formation and compensation of a phase difference caused by delays.

In this connection, reference is made to the example of FIG. 6, presuming that the phase difference of a signal transmitted and received during station's own transmission is measured to be 517 μs. From the given source data the propagation delay of 49 μs. has been calculated. The phase of the data signal to the transmitter Tx is shifted earlier with the total delay of 566 μs prior to feeding the signal to point T.

I claim:

1. Apparatus for synchronizing radio transmitters in a paging network comprising:
    means for transmitting a digital synchronization command signal from a paging network unit (PNU) to a plurality of base stations, said command signal including a synchronization initiating time for each base station in accordance with a pre-established synchronization plan;
    means for transmitting a first synchronization signal from the transmitter of a pre-determined first base station at an instant prescribed by said synchronization command signal;
    means for receiving said first synchronization signal by the receiver of at least one base station within the reception range thereof;
    means for synchronizing particular receiving base stations to said first synchronization signal if synchronization is indicated by comparison of the first synchronization signal with said command signal.

2. Apparatus as set forth in claim 1 wherein said digital synchronization command signal is transmitted simultaneously to said plurality of base stations.

3. Apparatus as set forth in claim 1 wherein said digital synchronization command signal is transmitted over solid conductors.

4. Apparatus as set forth in claim 1 wherein said first synchronization signal is transmitted via radio waves.

5. Apparatus as set forth in claim 1 and further comprising:
    means for deactivating the transmitter of said first base station after synchronization of said particular receiving base stations to said first synchronization signal;
    means for activating the transmitters of said particular base stations after synchronization of said particular receiving base stations to said first synchronization signal.

6. Apparatus as set forth in claim 1 wherein said pre-established synchronization plan is calculated by said paging network unit (PNU) and further comprising:
    means for determining the synchronization order of base stations on the basis of relative geographic locations of said stations;
    means for determining the synchronization order of base stations to minimize the number of sequences of subsequent synchronization signals;
    means for determining the synchronization order of base stations to maximize the number of base stations which are synchronized simultaneously in parallel in each synchronization sequence.

7. Apparatus as set forth in claim 1 and further comprising:
    means for using the paging network unit (PNU) to determine the instant to transmit the paging information by radio transmitters;
    means for transmitting simultaneous signals having a maximum phase difference ¼ of a bit from said transmitters.

8. Apparatus as set forth in claim 1 wherein said synchronization command signal includes information about the distance from a synchronizing base station to a base station to be synchronized, and further comprising:
    means for calculating the signal propagation delay caused by said distance;
    means for correcting the phase of said first synchronization signal based on said propagation delay by shifting said first synchronization signal in time in an amount proportional to said delay.

9. Apparatus as set forth in claim 1 and further comprising:
    means for transmitting subsequent synchronization signals from the transmitters of previously synchronized base stations at an instant prescribed by said synchronization command signal;

means for receiving said subsequent synchronization signals by the receivers of base stations within the reception range thereof;

means for synchronizing particular receiving base stations to said subsequent synchronization signals if synchronization is indicated by comparison of the subsequent synchronization signals with said command signal.

10. Apparatus as set forth in claim 9 wherein said subsequent synchronization signals are transmitted via radio waves.

11. Apparatus as set forth in claim 9 and further comprising:

means for deactivating the transmitters of said previously synchronized base stations after synchronization of said particular receiving base stations to said subsequent synchronization signals;

means for activating the transmitters of said particular receiving base stations after synchronization of said particular receiving base stations to said subsequent synchronization signals.

12. Apparatus as set forth in claim 9 wherein said synchronization command signal includes information about the distance from a synchronizing base station to a base station to be synchronized, and further comprising:

means for calculating the signal propagation delay caused by said distance;

means for correcting the phase of subsequent synchronization signals based on said propagation delay by shifting said subsequent synchronization signals in time in an amount proportional to said delay.

13. Apparatus as set forth in claim 9 wherein propagation delay within a base station transceiver is determined and its effects corrected by:

means for transmitting a signal from the transceiver of a base station and receiving said signal by said transceiver and for measuring the propagation delay within the transceiver;

means for correcting the phase of subsequent signals based on said propagation delay within the transceiver by shifting said subsequent signals in time in an amount proportional to said delay.

14. Apparatus as set forth in claim 9 and further comprising:

means for transmitting paging message signals from said paging network unit to said plurality of base stations.

15. Apparatus as set forth in claim 14 wherein said paging message signals are transmitted simultaneously from said paging network unit to said plurality of base stations.

16. Apparatus as set forth in claim 14 wherein said paging message signals are transmitted to said plurality of base stations via solid conductors.

17. Apparatus as set forth in claim 14 wherein said paging message signals and said first synchronization signal are transmitted to said base stations at different times.

18. Apparatus as set forth in claim 14 wherein said paging message signals and said first synchronization signal are transmitted to said base stations via difference conducting media.

19. Apparatus as set forth in claim 14 wherein said paging message signals and said subsequent synchronization signals are transmitted to said base stations at different times.

20. Apparatus as set forth in claim 14 wherein said paging message signals and said subsequent synchronization signals are transmitted to said base stations via different conducting media.

21. Apparatus as set forth in claim 14 wherein said base stations transmit said first synchronization signal and said subsequent synchronization signals to other base stations as well as transmit said paging message signals to paging receivers.

22. Apparatus as set forth in claim 14 wherein said base stations transmit said first synchronization signal, said subsequent synchronization signals and said paging message signals at the same frequency.

23. A method for synchronizing radio transmitters in a paging network comprising:

transmitting a digital synchronization command signal from a paging network unit (PNU) to a plurality of base stations, said command signal including a synchronization initiating time for each base station in accordance with a pre-established synchronization plan;

transmitting a first synchronization signal from the transmitter of a pre-determined first base station at an instant prescribed by said synchronization command signal;

receiving said first synchronization signal by the receiver of at least one base station within the reception range thereof;

synchronizing particular receiving base stations to said first synchronization signal if synchronization is indicated by comparison of the first synchronization signal with said command signal.

24. A method as set forth in claim 23 wherein said digital synchronization command signal is transmitted simultaneously to said plurality of base stations.

25. A method as set forth in claim 23 wherein said digital synchronization command signal is transmitted over solid conductors.

26. A method as set forth in claim 23 wherein said first synchronization signal is transmitted via radio waves.

27. A method as set forth in claim 23 and further comprising:

deactivating the transmitter of said first base station after synchronization of said particular receiving base stations to said first synchronization signal;

activating the transmitters of said particular base stations after synchronization of said particular receiving base stations to said first synchronization signal.

28. A method as set forth in claim 23 wherein said pre-established synchronization plan is calculated by said paging network unit (PNU) and further comprising:

determining the synchronization order of base stations on the basis of relative geographic locations of said stations;

determining the synchronization order of base stations to minimize the number of sequences of subsequent synchronization signals;

determining the synchronization order of base stations to maximize the number of base stations which are synchronized simultaneously in parallel in each synchronization sequence.

29. A method as set forth in claim 23 and further comprising:

using the paging network unit (PNU) to determine the instant to transmit the paging information by radio transmitters;

transmitting simultaneous signals having a maximum phase difference of ¼ of a bit from said transmitters.

30. A method as set forth in claim 23 wherein said synchronization command signal includes information about the distance from a synchronizing base station to a base station to be synchronized, and further comprising:

calculating the signal propagation delay caused by said distance;

correcting the phase of said first synchronization signal based on said propagation delay by shifting said first synchronization signal in time in an amount proportional to said delay.

31. A method as set forth in claim 23 and further comprising:

transmitting subsequent synchronization signals from the transmitters of previously synchronized base stations at an instant prescribed by said synchronization command signal;

receiving said subsequent synchronization signals by the receivers of base stations within the reception range thereof;

synchronizing particular receiving base stations to said subsequent synchronization signals if synchronization is indicated by comparison of the subsequent synchronization signals with said command signal.

32. A method as set forth in claim 31 wherein said subsequent synchronization signals are transmitted via radio waves.

33. A method as set forth in claim 31 and further comprising:

deactivating the transmitters of said previously synchronized base stations after synchronization of said particular receiving base stations to said subsequent synchronization signals;

activating the transmitters of said particular receiving base stations after synchronization of said particular receiving base stations to said subsequent synchronization signals.

34. A method as set forth in claim 31 wherein said synchronization command signal includes information about the distance from a synchronizing base station to a base station to be synchronized, and further comprising:

calculating the signal propagation delay caused by said distance;

correcting the phase of subsequent synchronization signals based on said propagation delay by shifting said subsequent synchronization signals in time in an amount proportional to said delay.

35. A method as set forth in claim 31 wherein propagation delay within a base station transceiver is determined and its effects corrected by:

transmitting a signal from the transceiver of a base station and receiving said signal by said transceiver and for measuring the propagation delay within the transceiver;

correcting the phase of subsequent signals based on said propagation delay within the transceiver by shifting said subsequent signals in time in an amount proportional to said delay.

36. A method as set forth in claim 31 and further comprising:

transmitting paging message signals from said paging network unit to said plurality of base stations.

37. A method as set forth in claim 36 wherein said paging message signals are transmitted simultaneously from said paging network unit to said plurality of base stations.

38. A method as set forth in claim 36 wherein said paging message signals are transmitted to said plurality of base stations via solid conductors.

39. A method as set forth in claim 36 wherein said paging message signals and said first synchronization signal are transmitted to said base stations at different times.

40. A method as set forth in claim 36 wherein said paging message signals and said first synchronization signal are transmitted to said base stations via different conducting media.

41. A method as set forth in claim 36 wherein said paging message signals and said subsequent synchronization signals are transmitted to said base stations at different times.

42. A method as set forth in claim 36 wherein said paging message signals and said subsequent synchronization signals are transmitted to said base stations via different conducting media.

43. A method as set forth in claim 36 wherein said base stations transmit said first synchronization signal and said subsequent synchronization signals to other base stations as well as transmit said paging message signals to paging receivers.

44. A method as set forth in claim 36 wherein said base stations transmit said first synchronization signal, said subsequent synchronization signals and said paging message signals at the same frequency.

* * * * *